(12) United States Patent
Pontin (10) Patent No.: US 9,659,488 B2
(45) Date of Patent: May 23, 2017

(54) METROLOGY WITH UNIVERSAL SERIAL BUS (USB) CONNECTION

(71) Applicant: Itron, Inc., Liberty Lake, WA (US)

(72) Inventor: Joseph Pontin, Seneca, SC (US)

(73) Assignee: Itron, Inc., Liberty Lake, WA (US)

(*) Notice: Subject to any disclaimer, the term of this patent is extended or adjusted under 35 U.S.C. 154(b) by 167 days.

(21) Appl. No.: 13/717,136

(22) Filed: Dec. 17, 2012

(65) Prior Publication Data

US 2014/0167974 A1    Jun. 19, 2014

(51) Int. Cl.
*G08C 19/00* (2006.01)
*G01D 4/00* (2006.01)

(52) U.S. Cl.
CPC .............. *G08C 19/00* (2013.01); *G01D 4/002* (2013.01); *Y02B 90/241* (2013.01); *Y04S 20/32* (2013.01)

(58) Field of Classification Search
CPC ...... G01D 44/001; G08C 19/00; G08C 17/02; G08C 2201/50; Y04S 20/32; Y02B 90/241
USPC ........................................ 340/870.02, 870.04
See application file for complete search history.

(56) References Cited

U.S. PATENT DOCUMENTS

| | | | | |
|---|---|---|---|---|
| 6,549,014 | B1 * | 4/2003 | Kutkut et al. | 324/426 |
| 7,216,108 | B2 * | 5/2007 | Hastings et al. | 705/63 |
| 7,417,420 | B2 * | 8/2008 | Shuey | 324/764.01 |
| 7,434,076 | B1 | 10/2008 | Altounian et al. | |
| 7,583,197 | B2 | 9/2009 | Wesby Van Swaay | |
| 8,094,010 | B2 | 1/2012 | Wesby-van Swaay | |
| 8,489,248 | B2 * | 7/2013 | Carson | 700/295 |
| 8,605,457 | B2 * | 12/2013 | Khan | 361/807 |
| 2004/0120421 | A1 | 6/2004 | Filipovic | |
| 2007/0149257 | A1 | 6/2007 | Cheresh et al. | |
| 2007/0162956 | A1 * | 7/2007 | Tucker | G06F 11/27 726/2 |
| 2007/0183717 | A1 * | 8/2007 | Gorrell | 385/39 |
| 2008/0238713 | A1 * | 10/2008 | Banhegyesi | G01R 22/065 340/870.02 |
| 2008/0300919 | A1 * | 12/2008 | Charlton et al. | 705/2 |
| 2009/0028098 | A1 | 1/2009 | Gates et al. | |
| 2009/0120810 | A1 * | 5/2009 | Phan et al. | 205/792 |

(Continued)

FOREIGN PATENT DOCUMENTS

| | | |
|---|---|---|
| DE | 202012010818 U1 | 11/2012 |
| EP | 2249168 A1 | 11/2010 |
| GB | 2394077 A | 4/2004 |

OTHER PUBLICATIONS

PCT Search Report and Written Opinion mailed Jan. 21, 2014 for PCT Application # PCT/US13/67581, 8 pages.

(Continued)

*Primary Examiner* — Joseph Feild
*Assistant Examiner* — Omar Casillashernandez
(74) *Attorney, Agent, or Firm* — Lee & Hayes, PLLC (57) ABSTRACT

Data communication may be accomplished between a utility meter and a peripheral device via a universal serial bus (USB) connection and a USB protocol. The meter may include metrology components arranged to measure utility consumption at a site. The meter may further include components for providing the data communication with the peripheral via the universal serial bus (USB) connection and a USB protocol. In an implementation, the meter provides electrical isolation between the data communication components and the metrology components.

19 Claims, 5 Drawing Sheets

(56) References Cited

U.S. PATENT DOCUMENTS

| | | | |
|---|---|---|---|
| 2009/0243869 A1 | 10/2009 | Sanderford, Jr. | |
| 2010/0278187 A1 | 11/2010 | Hart et al. | |
| 2011/0004357 A1* | 1/2011 | Mathiowetz | 700/295 |
| 2011/0172938 A1 | 7/2011 | Gu et al. | |
| 2011/0194543 A1 | 8/2011 | Zhao et al. | |
| 2011/0238311 A1* | 9/2011 | Kuhns et al. | 702/1 |
| 2011/0285546 A1* | 11/2011 | Vadali | 340/870.16 |
| 2013/0057367 A1* | 3/2013 | Smith | 333/24 C |
| 2013/0066571 A1* | 3/2013 | Chamarti | G01D 4/00 702/62 |
| 2013/0095877 A1 | 4/2013 | Smith et al. | |
| 2013/0176141 A1* | 7/2013 | LaFrance et al. | 340/870.02 |
| 2013/0257413 A1* | 10/2013 | Nahar | 324/149 |
| 2014/0019384 A1* | 1/2014 | Hanley et al. | 705/412 |

OTHER PUBLICATIONS

Office Action from the Canadian Intellectual Property Office, Application No. 2,755,393, mailed on Oct. 29, 2012, 2 pages.
Office Action from the Canadian Intellectual Property Office, Application No. 2,755,393, mailed on Mar. 2, 2012, 3 pages.
Office Action from the Canadian Intellectual Property Office, Application No. 2,755,393, mailed on Jul. 16, 2012, 2 pages.
PCT Search Report for Application No. PCT/US2011/062791, mailed on Feb. 22, 2012, 2 pages.
PCT Written Opinion for Application No. PCT/US2011/062791, mailed on Feb. 22, 2012, 7 pages.
Reid, Doug, "Cradlepoint MBR900 Mobile Broadband N Router Reviewed," Feb. 22, 2011, 15 pages.
The European Office Action mailed Jul. 26, 2016 for European patent application No. 13788868.1, a counterpart foreign application of U.S. Appl. No. 13/717,136, 5 pages.

* cited by examiner

METROLOGY WITH UNIVERSAL SERIAL BUS (USB) CONNECTION

BACKGROUND

Modern utility meters and similar devices are becoming increasingly technologically complex. For example, many such devices have a capability to communicate with remote nodes. The devices may use wired or wireless networks to communicate, such as through mobile telephone networks. They may transmit data, such as utility consumption data, for example, to a remote hub, a remote server, or the like. In other cases, the meters may transmit data to a mobile unit as the mobile unit travels within proximity of the device.

With many utility meters, however, it may be necessary to interface directly or physically with the meter to perform some functions or to exchange some data with the meter. For example, a firmware or software update to the meter may necessitate a physical interface with the meter. Likewise, in some cases it may be necessary to "plug in" to the meter to provision the meter during installation, or to perform diagnostics or maintenance on the meter after it has been in service.

In many cases, utility meters have employed an optical interface for data communication during such instances. However, the optical interface can have a low data rate and may not be suitable for transmission of large amounts of data. While meters are being designed to be "smarter," the amounts of data that may be transmitted during installation or maintenance, for example, can be substantial. Other forms of data communication are not always feasible, due to the components generally used in meters, which are selected based on design and cost specifications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 is a perspective view of an example utility meter, wherein the techniques and devices disclosed herein may be applied. FIG. 1 includes a view of the example meter with an enclosure in place, and with the enclosure removed to show example interior components.

FIG. 3 is a simplified perspective view of an example motherboard and an example processor board of the utility meter of FIG. 1. FIG. 3 shows some details of an example technique for electrical isolation of sections of the motherboard, according to an implementation.

FIG. 4 is a perspective view of the example utility meter of FIG. 1, according to one embodiment with a terminal cover in place. In the illustration, a peripheral device is arranged to interface with the meter. FIG. 4 also shows an example of an access panel for a communication interface, with respect to the terminal cover, according to an implementation.

DETAILED DESCRIPTION

Overview

Peripheral devices may interface with utility meters (and like devices) during installation, maintenance, testing, and various other scenarios with regard to the meters. During such instances, the peripheral device and the meter may exchange data. For example, the peripheral device may upload a firmware update to the meter, it may download performance data from the meter, or the like.

Existing data communication ports on meters, such as optical ports, may be insufficient to provide the data throughput desired when interfacing with some peripheral devices. For example, optical ports generally used with meters can have a low data rate and may not be suitable for transmission of large amounts of data. However, increasingly larger amounts of data are desired to be exchanged between meters and peripherals as the meters become more technologically advanced.

Representative implementations of devices and techniques provide data communication between a utility meter, or like device, and a peripheral device. In some implementations, the meter may include metrology components arranged to measure or analyze utility consumption (i.e., resource consumption) at a site. In the implementations, the meter may also include components for providing the data communication with the peripheral via a universal serial bus (USB) connection and a USB protocol.

In an implementation, the utility meter includes at least one processor and one or more computer-readable storage devices. For example, the computer-readable storage devices may include a full functioning operating system (OS) operable (i.e., executable) on the processor(s). In the implementation, the OS and/or processor are arranged to facilitate data transfer between the peripheral and the meter via the USB connection.

In various embodiments, the meter provides electrical isolation between the data communication components and the metrology components. For example, in one implementation, the electrical isolation is provided by a predetermined spacing of conductors separated by a dielectric or insulator. In other words, the data section conductors and components are kept at least a predetermined distance from the metrology section conductors and components with a dielectric or insulating material located therebetween. This may be the case when data section conductors and components and metrology section conductors and components are located on the same board or carrier, for example.

The communication techniques are described herein in the context of a utility meter. However, other nodes of a utility network may also be included, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other utility network devices.

Peripheral devices may include any and all devices that may interface with a meter for the purpose of providing data to the meter or retrieving data from the meter, including providing communications for the meter. Providing data to the meter may include adjusting or calibrating the meter, updating firmware or software of the meter, provisioning the meter, providing sensory data to the meter, providing analysis or processing of meter data, and the like. Retrieving data from the meter may include downloading diagnostic data from the meter, retrieving consumption or quality information from the meter, pulling identification information from the meter, and the like. In various implementations, one or more peripheral devices may be in communication with the meter at a given time via the USB connection.

Multiple and varied implementations and embodiments are described below, with examples illustrated in the figures. This Overview and the following sections, including the section headings, are merely illustrative implementations and embodiments and should not be construed to limit the scope of the claims.

Example Utility Meter

Figure 1:
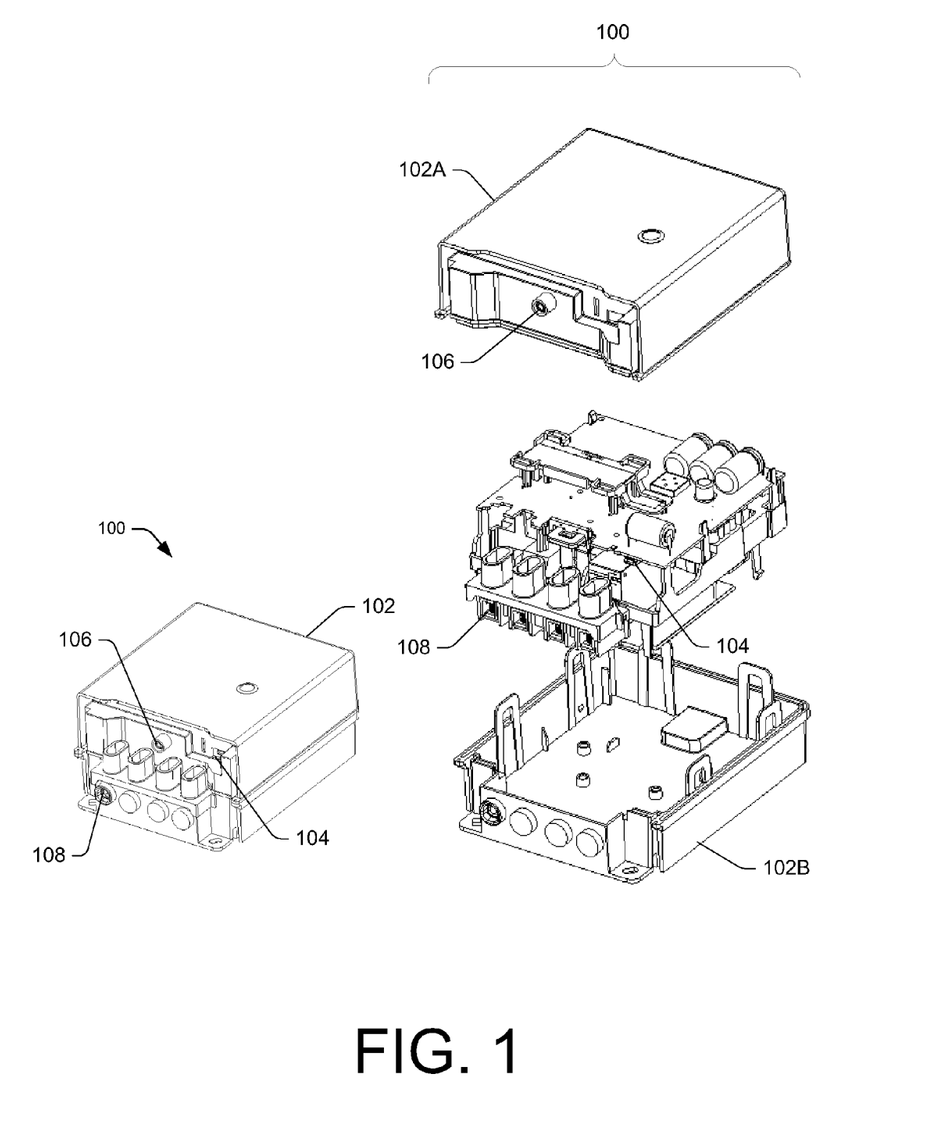

FIG. 1 is a perspective view of an example utility meter 100, wherein the techniques and devices disclosed herein may be applied. FIG. 1 includes a view of the example meter 100 with an enclosure 102 (comprising halves 102A and 102B, for example) in place, and with the enclosure 102 removed to show example interior components.

In various implementations, the enclosure 102 may be comprised of one or more components or sections. In the implementations, the enclosure 102 may be suitable for protecting the meter 100 from the elements in outdoor environments, protecting the meter 100 from tampering, and the like.

In one implementation, as shown in FIG. 1, the meter 100 may include a communications port 104 arranged to provide communications with a peripheral device (see FIG. 4, peripheral device 404) using a universal serial bus (USB) connection. In an example, the meter 100 communicates with the peripheral device via a USB protocol. In various implementations, as shown in FIG. 1, the meter 100 may additionally include an optical port (or another type of communications port, e.g., coaxial, twisted pair, Ethernet, etc.) arranged to transfer data with a peripheral device.

The meter 100 may include a meter seal 106 that must be broken to remove the enclosure to access the interior of the meter 100. The meter also includes one or more terminals 108 arranged to couple the meter 100 to a utility service.

In various embodiments, the meter 100 is arranged to collect, transmit, store, and/or process data corresponding to measured utility parameters, such as utility consumption, at a site. In alternate implementations, a meter 100 may include fewer, additional, or alternate components and remain within the scope of this disclosure.

Figure 2:
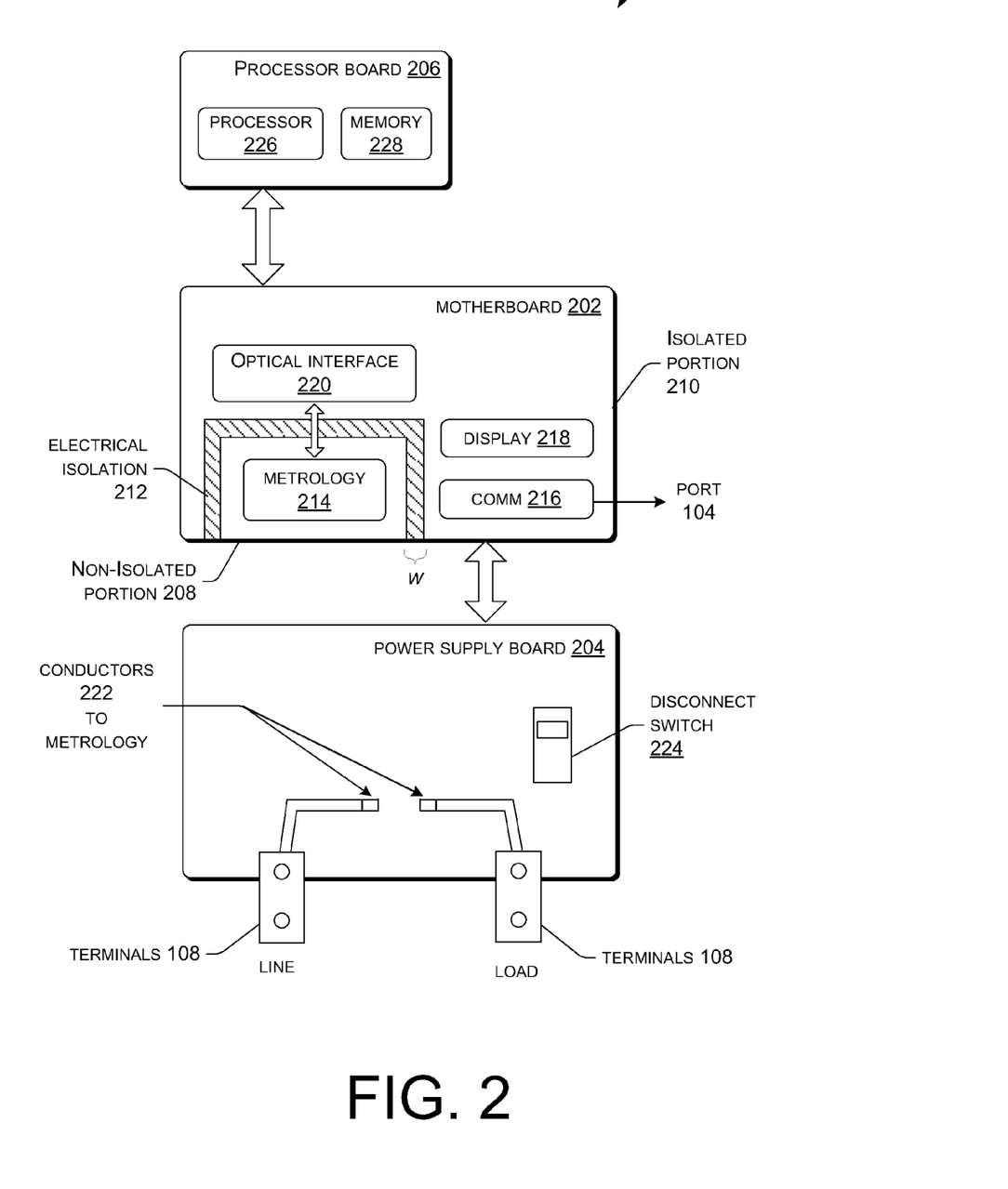
FIG. 2 is a schematic diagram of the example utility meter of FIG. 1, according to one implementation, showing some details of example components and connectivity.

FIG. 2 is a schematic diagram of the example utility meter 100 of FIG. 1, according to one implementation, showing some details of example components and example connectivity. As shown in FIG. 2, a meter 100 may include a motherboard 202, a power supply board 204 and a processor board 206.

If included, a motherboard 202 may include a first non-isolated portion 208 and a second isolated portion 210. For example, the non-isolated portion 208 may include line voltages (e.g., 120V, 208V, 240V, etc.), in the case of an electrical service meter 100, and the isolated portion 210 may be isolated from the line voltages. The isolated portion 210 may be associated with a DC voltage used to operate the components located at the isolated portion 210 (e.g., 24VDC, 10VDC, 5VDC, etc.), for example. The USB port 104 is disposed on the isolated portion 210 of the motherboard 202. Isolating the second portion 210 from the first portion 208 increases the safety of maintenance personnel that may be interfacing with the USB port 104, and protects various low-voltage components of the meter 100 from line voltages. The USB port 104 may be powered by a DC power supply on the isolated portion of the motherboard 202.

Typically, electrical isolation of a USB port from a high voltage source is accomplished using a USB voltage isolation chip. However, such voltage isolation chips are costly. In the embodiment shown in FIGS. 2 and 3, the motherboard includes an electrical isolation portion 212 arranged to electrically isolate the first portion 208 from the second portion 210. This electrical isolation portion 212 eliminates the need for a costly USB voltage isolation chip. In one example, the isolation portion 212 comprises a gap or spacing between conductors of a predetermined distance w. For example, the distance w is the narrowest portion of the gap that is the isolation portion 212.

Figure 3:
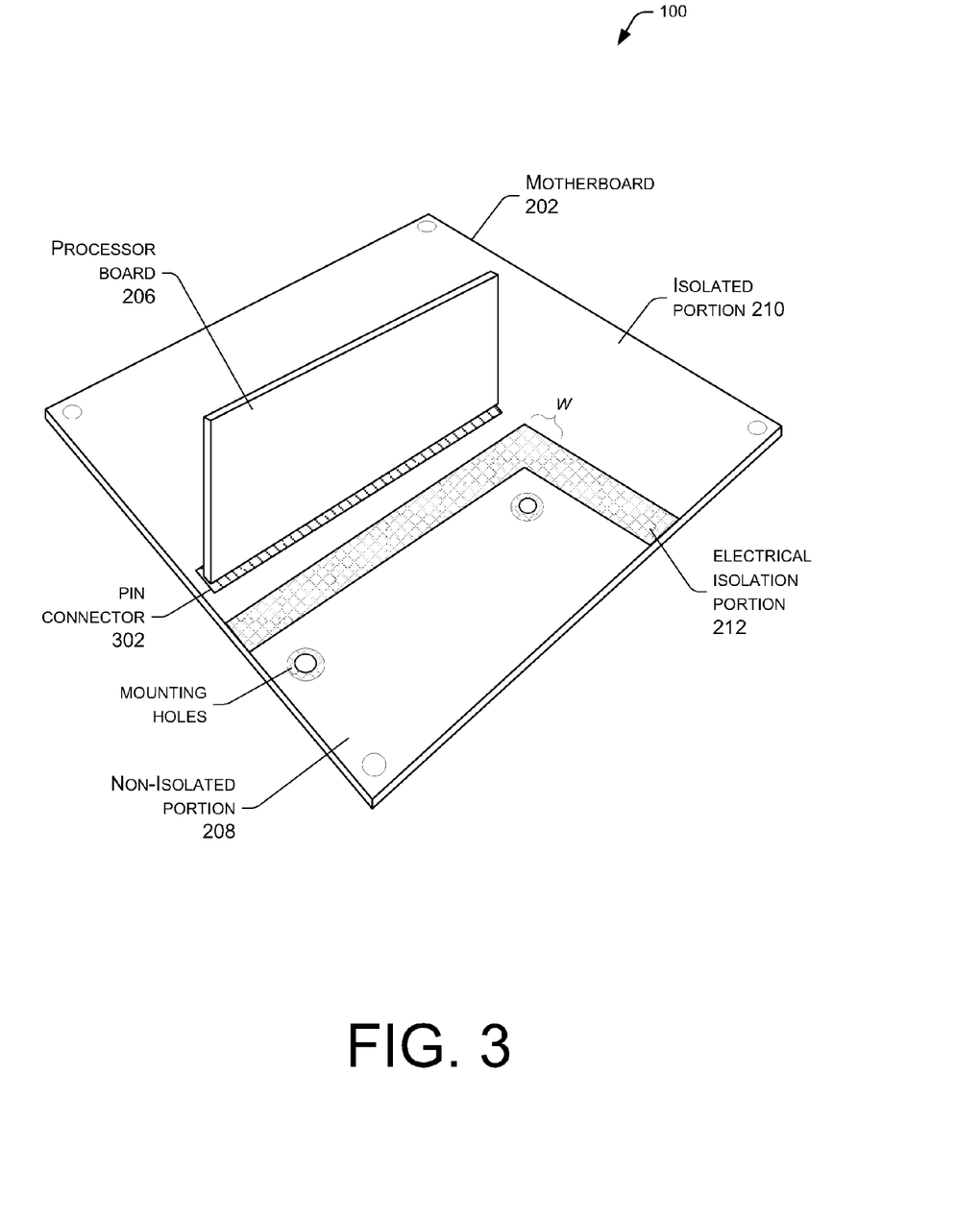

FIG. 3 is a simplified perspective view of an example motherboard 202 and an example processor board 206 of the utility meter 100. FIG. 3 shows some details of an example technique for electrical isolation of sections of the motherboard 202, according to an implementation.

In various implementations, the isolation portion 212 may be realized by removing (etching, for example) conducive material from the motherboard 202 or forming a gap in the conductive surface (e.g., copper plating) of the motherboard 202 having a width of distance w. In other implementations, the isolation portion 212 is realized by arranging conductors such that they have a spacing or a gap of distance w. In one implementation, the distance w comprises at least the distance that 4000 volts is incapable of arcing across, within an air dielectric. In other implementations, the distance w is associated with other peak voltage arcing levels. In further implementations, other dielectrics (e.g., oils, plastics, semiconductor materials, etc.) may be used to realize the isolation portion 212, and reduce or adjust the distance w for the desired voltage protection level.

Referring back to FIG. 2, in an implementation, the first portion 208 (the non-isolated portion) includes metrology components 214 arranged to measure utility parameters, such as utility consumption at a site, for example. In alternate implementations, the metrology components 214 may be configured to measure other utility parameters, such as voltage or current levels, power factor, and the like. In an embodiment, the non-isolated portion 208 is not isolated from the measured utility conductors, for example. Accordingly, the components of the meter 100 located within the non-isolated portion 208 are configured to be coupled to the utility conductors, or to be in close proximity to the utility conductors, and so forth.

In one implementation, the metrology components 214 include a Hall Effect sensor, and are arranged to be in close proximity to the utility conductors to measure the utility parameters. In one example, the utility conductors are coupled to a partially-coiled conductor which is arranged within the meter 100 to be in close proximity to the Hall Effect sensor. The Hall Effect sensor is arranged to sense a magnetic field surrounding the partially-coiled conductor that results when current flows through the partially-coiled conductor. The Hall Effect sensor is arranged to output a signal proportional to the magnetic field detected, providing a measurement of the current draw at the site, for example. In other examples, the metrology components 214 may comprise a shunt and/or other metrology sensing components.

In various implementations, the second portion 210 (the isolated portion) of the motherboard 202 may include communications components ("comm") 216, display components ("display") 218, optical interface components ("optical") 220, and the like. In an implementation, as shown in FIG. 2, the comm 216 includes communications components arranged to provide a USB connection, via port 104, for the meter 100. For example, the comm 216 includes hardware, circuit components, and transmission lines (i.e., bus) to provide the USB connection. In an implementation, the communication components that provide the USB connection comprise a 4000 volt isolated compliant interface, due to the isolation provided by the isolation portion 212.

In alternate implementations, the comm 216 also includes components arranged to provide other communication types and forms (e.g., for optical port 106, for network communications such as wide area network (WAN), metropolitan area network (MAN), local area network (LAN), neighborhood area network (NAN), personal area network (PAN), Wi-Fi (HAN), cellular, near-field, PLC, RF, etc.). In various embodiments, the comm 216 provides combinations of communication types and forms. While the comm 216 is shown as part of the motherboard 202, in other embodiments, some or all of the functionality described as being performed by comm 216 may be implemented by a separate communication board or module (not shown). In one specific embodiment, the USB connection and related software and hardware components may be disposed on the motherboard 202, while other communication technologies (e.g., those used to communicate with other devices in a utility communication network) are located on a separate communication board or module.

If included, the display 218 includes components arranged to provide a display for the meter 100. For example, the display 218 may include display hardware, driver hardware and associated circuits to provide a display of information for viewing by a user, for example. In various implementations, the display may include a liquid crystal display (LCD) readout or the like. In other implementations, the display may include indicators (light-emitting diodes (LED), for example), a graphical user interface, a touchscreen, or the like, or combinations of the same.

In one implementation, the motherboard 202 includes an optical interface 220 arranged to interface the non-isolated portion 208 with the isolated portion 210. The optical interface 220 provides electrically isolated information transfer between the non-isolated portion 208 and the isolated portion 210. In one example, the optical interface comprises one or more optocouplers. In alternate implementations, other forms of interface may be used, such as wireless transmission (e.g., Zigbee, WiFi, near field communication, or the like), for example, to pass data from the first portion 208 to the second portion 210 of the motherboard 202.

In alternate implementations, other components or systems may be included on the motherboard 202. For example, direct current (DC) power management components, registers for peripherals, and other components may be included in various embodiments.

If included, the power supply board 204 may include one or more conductors 222 arranged to carry the current consumed at the site. For example, the conductors 222 may be coupled to the utility conductors of the site by one or more of the utility conductor terminals 108. In an implementation, the conductors 222 transmit the current to the partially-coiled conductor(s) of the metrology 214 discussed above. In other words, the power supply board 204 is arranged to convey utility consumption information to the metrology 214 components of the first (non-isolated) portion 208 of the motherboard 202, and to supply low voltage DC electrical power to the second (isolated) portion 210 of the motherboard 202.

The power supply board 204 includes a DC power supply arranged to power the DC powered components of the second (isolated) portion 210 of the motherboard 202 and/or other portions of the meter 100 (e.g., comm 216, display 218, optical interface 220, processor 226, memory 228, etc.). Accordingly, the power supply board 204 is coupled via power conductors to the motherboard 202 and may also be coupled to the processor board 206 via power conductors.

In an implementation, the power supply board 204 includes a disconnect switch 224. For example, the disconnect switch 224 may be used to disconnect utility service to the site (e.g., for maintenance, emergencies, etc.) through the meter 100. Additionally or alternatively, the power supply board 204 may include surge protection, additional switches, breakers, and the like.

If included, the processor board 206 includes one or more processor(s) 226 communicatively coupled to at least one computer readable memory storage device ("memory") 228. In an implementation, the processor board 206 is coupled to the motherboard 202. For example, power conductors and/or data conductors are coupled between the processor board 206 and the motherboard 202. Referring to FIG. 3, in one implementation, the processor board 206 is coupled to the motherboard 202 using a multi-pin board connector 302. In the implementation, the processor board 206 is pushed into the pin connector 302, and held in place by friction, for example. In the implementation, some of the pins of the pin connector 302 carry data, and others may carry power between the motherboard 202 and the processor board 206. In alternate implementations, the processor board 206 is coupled to the motherboard 202 with other techniques and/or devices.

Referring back to FIG. 2, in an implementation, the processor 226 is arranged to facilitate data transfer via the USB connection. For example, in an implementation, the meter 100 includes a fully-functional operating system (OS) stored on the memory 228 and operable on the processor 226 to facilitate data transfer via the USB connection.

In an implementation, the OS comprises a full multitasking OS such as a Linux-based OS, a Windows™ based OS (e.g., Windows CE), or the like. For the purposes of this disclosure, a full OS includes all OS components and capabilities necessary to implement, administer, manage, and the like, a USB communication connection or a set of multiple USB connections. In the implementation, the OS running on the processor is capable of implementing, administering, managing, and the like, the USB connection(s), and is arranged to do so.

A processor 226, for the purposes of this disclosure includes a computing device capable of running a full OS as described above, and processing one or multiple USB connections. The processor 226 is coupled to the memory 228, and arranged to execute computer-executable instructions stored on the memory 228, including instructions associated with running a full OS and one or more USB connections.

The memory 228 may be configured to store one or more software and/or firmware modules, which are executable on the processor(s) 226 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

A memory 228 includes any of various hardware devices arranged to store and/or organize data and/or computer executable instructions. Memory 228 hardware devices may be based on magnetics, optics, logic, semiconductors, capacitances, and the like, or combinations of the same. For example, the memory 228 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

In an implementation, the boards 202, 204, and/or 206 are printed circuit boards (PCB), modules, or the like. They may be coupled using cables, pinned connectors, optical connections, other conductors, and the like. In alternate implementations, the boards 202, 204, and 206 may be combined in various arrangements including fewer or additional boards or modules. For example, in one alternate implementation, one or more boards 202, 204, and 206 or a portion of the boards 202, 204, and 206 are enclosed in a separate enclosure from the enclosure 102, or located remote from the other boards 202, 204, and 206.

Example Implementations

Figure 4:
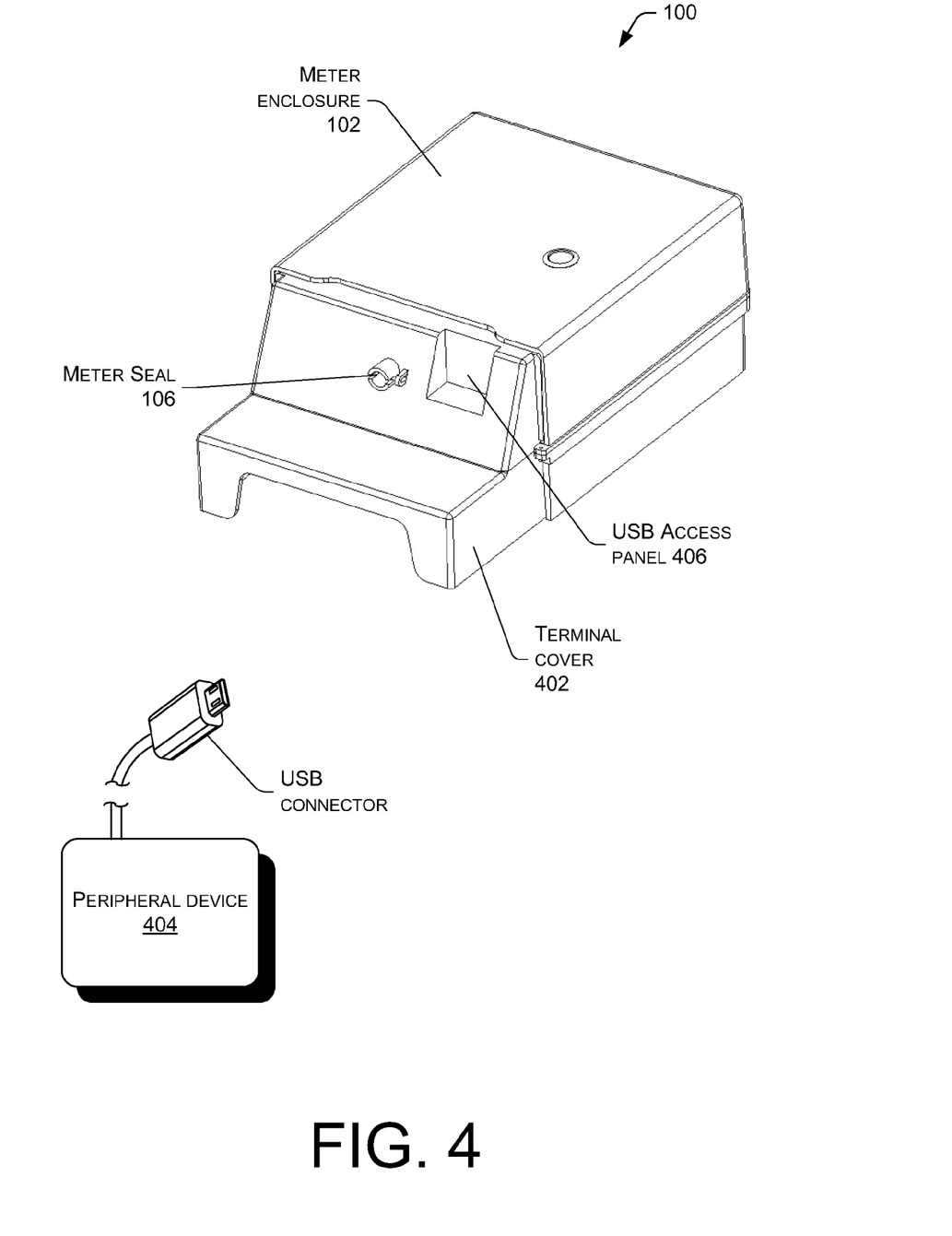

In various implementations, a peripheral device may communicate with the meter 100 via a USB connection. FIG. 4 is a perspective view of an example utility meter 100, according to one embodiment with a terminal cover 402 in place. In an implementation, a terminal cover 402 may be arranged to at least partly cover one or more of the terminals 108 to protect them from tampering, the elements, and the like. As shown in FIG. 4, the terminal cover 402 may mate with the meter enclosure 102 to provide protection to the meter 100.

In the illustration of FIG. 4, a peripheral device 404 is arranged to interface with the meter 100. The peripheral device 404 represents any peripheral devices, such as those discussed above, which are arranged to interface with (i.e., communicate with) the meter 100 via a USB connection at the meter 100 (e.g., data readers, firmware and/or software updaters, diagnostic devices, maintenance devices, communication devices, sensors, analysis devices, testers, displays, alarms, memory devices, etc.). In an implementation, the peripheral device is arranged to communicate with the meter 100 via the USB connection using a USB protocol. While a single USB port 104 is shown throughout the drawings, in other examples, two or more USB ports may be provided.

As shown in FIG. 4, in one implementation, a meter enclosure 102 may include an access panel 406 arranged to provide access to the USB connection via the port 104 from the exterior of the meter 100. In an implementation, the access panel 406 includes a seal with the terminal cover 402 and/or the enclosure 102. The use of an access panel 406 may provide protection to the port 104 when the USB connection is not being accessed from the exterior of the meter enclosure 102. Accordingly, the access panel 406 may be removed or opened when using the USB connection via the port 104 and replaced or closed when the port 104 is not in use from the exterior of the meter enclosure 102. If multiple USB ports are provided, a first USB port may be readily accessible, e.g., by opening the access panel 406, while a second USB port may be secured (e.g., may be located under and accessed by removal of the meter enclosure 102 and/or terminal cover 402) to limit physical access to authorized personnel. In that case, the first USB port may allow access to different functionality and/or be equipped with different levels of software/firmware security.

In various implementations, a meter 100 and a peripheral 404 may comprise a system. For example, a peripheral 404 may be installed at a meter 100 for extended periods of time or permanently. In one example, a peripheral 404 may comprise a sensor, such as an environmental sensor. The sensor may be arranged to provide temperature, humidity, pressure, or other environmental parameters to the meter 100 for processing by the processor 226, storage by the memory 228, and/or transmission by the comm 216, for example, for the lifetime of the meter 100. In another example, the peripheral may comprise an external antenna, signal amplifier, relay, gateway, or the like.

In alternate implementations, a peripheral 404 may be installed at a meter 100 for a brief or limited time period. Such an implementation may include during installation, testing, or maintenance of the meter 100. In various implementations, a plurality of peripherals 404 may be installed or employed at a meter 100 for various time periods.

In various embodiments, the peripheral device 404 receives power from the meter 100 via the USB connection. For example, the USB connection may provide 5 volts at a maximum current of 1 ampere to a peripheral device 404. In other examples, the USB connection may provide other power specifications to a peripheral device 404. In one implementation, the power supplied by the USB connection is sourced from the DC power supply of the power supply board 204.

In various implementations, the peripheral device 404 is arranged to be located external to the enclosure 102 of the meter 100 while coupled to the meter 100 via the USB connection. In other implementations, the peripheral device 404 may be arranged to be located internal to the enclosure 102 of the meter 100 while coupled to the meter 100 via the USB connection. In some implementations, one or more peripheral devices 404 may be located internal to the enclosure 102 while one or more other peripheral devices 404 are located external to the enclosure 102 of the meter 100.

Representative Process

Figure 5:
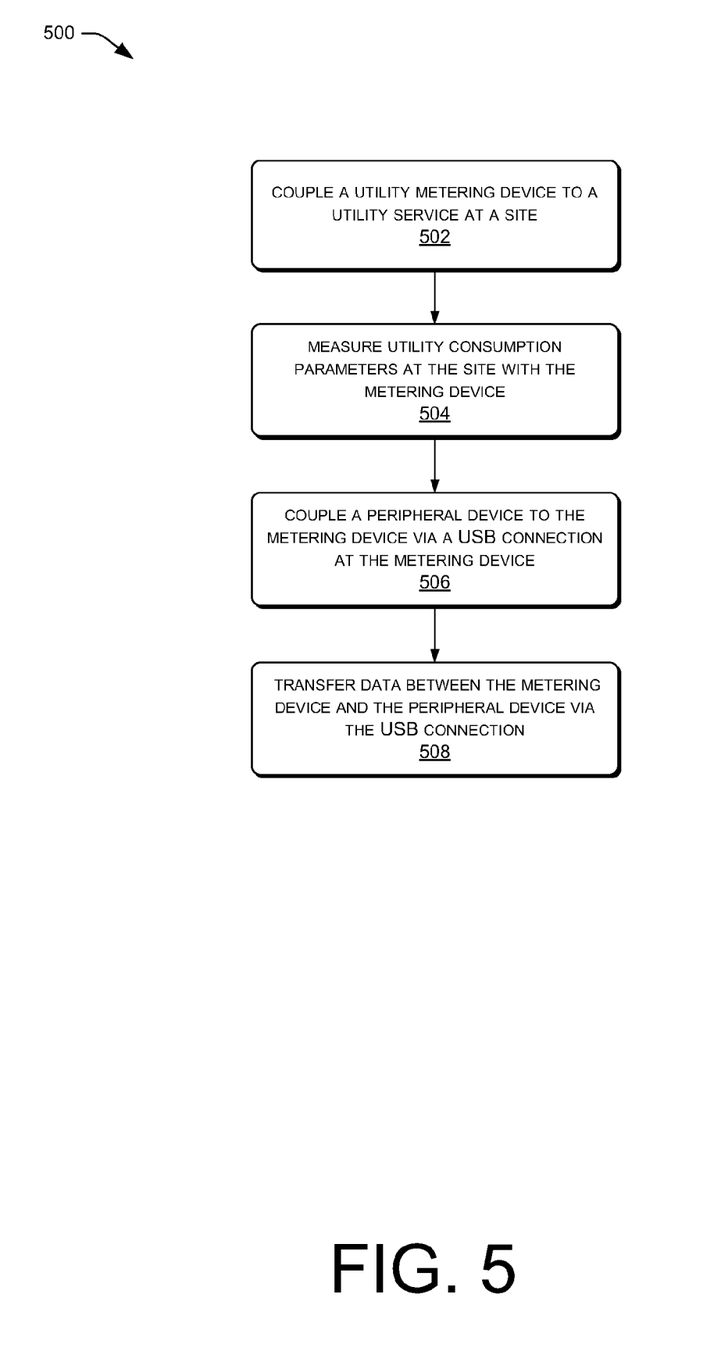
FIG. 5 is a flowchart illustrating an example method of communicating with a utility meter via a communication connection, according to an implementation.

FIG. 5 illustrates an example process 500 for communicating with a utility meter (such as meter 100, for example) via a communication connection, according to an implementation. In some implementations, the communication connection comprises a USB connection. The process 500 is described with reference to FIGS. 1-4, but is not limited to performance with the system and hardware of FIGS. 1-4. Moreover, the system and hardware of FIGS. 1-4 may be used to perform other processes.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 502, the process includes coupling a utility metering device (such as meter 100, for example) to a utility service at a site. In alternate implementations, the metering device is another type of node, such as a gateway device, a transformer, a utility communications component, a utility diagnostic component, or the like.

At block 504, the process includes measuring utility consumption parameters at the site with the metering device. For example, in an implementation, the process includes measuring utility (i.e., resource) consumption at the site. In further implementations, the process includes measuring other parameters of the utility service (e.g., quality, throughput, potential, etc.) at the site.

At block 506, the process includes coupling a peripheral device (such as peripheral device 404, for example) to the metering device via a universal serial bus (USB) connection at the metering device. In an implementation, the process includes enabling data transfer between the metering device and the peripheral device via the USB connection using an operating system (OS) stored on at least one computer-readable memory storage device (such as memory 228, for example) and operable on a processor (such as processor 226, for example) of the metering device. In the implementation, the OS administers the USB connection, including establishing the connection, maintaining the connection, managing the data transfer via a USB protocol, closing the connection when the physical link is terminated, and the like.

In an implementation, the process includes automatically installing or updating a driver associated with a peripheral device when it is connected to the metering device. In the implementation, the process includes establishing a network connection via a communications portion (such as comm 216, for example) of the metering device and downloading a USB driver for the peripheral device when the peripheral device is coupled to the metering device. For example, in the implementation, when the peripheral device is plugged into the USB port, the processor (via the OS) identifies the peripheral device, and starts a search of a local or remote network (such as the Internet, for example) for a suitable driver for the peripheral device. This search is performed after initiating a communication session via the metering device's communications components. When a driver is found, the metering device downloads the driver via the communication session and installs the driver to the metering device using the OS.

At block 508, the process includes transferring data between the metering device and the peripheral device via the USB connection. In an implementation, the process also includes supplying direct current (DC) power to the peripheral device via the USB connection.

In various implementations, the data transfer between the metering device and the peripheral device has various forms and functions. In one implementation, the process includes receiving sensor data at the metering device from the peripheral device via the USB connection. In another implementation, the process includes updating firmware and/or software of the metering device using the peripheral device via the USB connection. In a further implementation, the process includes running diagnostics and/or provisioning the metering device using the peripheral device via the USB connection. In other implementations, other data forms and functions are performed by the process, as discussed above.

In alternate implementations, other techniques may be included in the process 500 in various combinations, and remain within the scope of the disclosure.

CONCLUSION

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:
1. A utility meter comprising:
an enclosure;
a first printed circuit board (PCB) disposed within the enclosure, the first PCB including:
a first portion including metrology components arranged to measure utility consumption at a site, the metrology components including at least one sensor arranged to measure utility parameters; and
a second portion coupled to the first portion and arranged to transfer data between the utility meter and a peripheral device using a first universal serial bus (USB) connection and a first USB protocol, the second portion including a first USB port that is electrically isolated from a line voltage of the first portion via a predetermined conductor spacing between the first portion and the second portion, and the second portion including one or more optical interface components arranged on the second portion to interface with one or more of the metrology components of the first portion;
one or more terminals arranged to couple the utility meter to one or more utility conductors of a utility service; and
a second PCB disposed within the enclosure, the second PCB including one or more conductors coupled to the one or more terminals, the one or more conductors arranged to convey utility consumption information from the one or more terminals to the metrology components of the first portion of the first PCB;
a processor and at least one computer-readable memory storage device disposed on the first PCB or the second PCB, the processor arranged to facilitate data transfer with a peripheral device via the first USB connection;
a second USB connection having a second USB port; and
an access panel located on an exterior of the enclosure and positioned such that the first USB port is accessible by opening the access panel, the second USB port being accessible by removing the enclosure.

2. The utility meter of claim 1, further comprising a fully-functional operating system (OS) stored on the at least one computer-readable memory storage device and operable on the processor to facilitate the data transfer via the USB connection.

3. The utility meter of claim 1, wherein the utility meter is arranged to at least one of collect, transmit, store, or process data corresponding to measured utility consumption at the site.

4. A utility meter, comprising:
an enclosure;

an apparatus disposed within the enclosure, the apparatus arranged to collect data corresponding to utility consumption at a site, the apparatus including:
a first board including:
a non-isolated section including metrology hardware, the metrology hardware including at least one sensor arranged to measure utility parameters; and
an isolated section including data transfer components associated with a first universal serial bus (USB) connection, the isolated section including a first USB port that is electrically isolated from a line voltage of the non-isolated section based on a predetermined conductor spacing between the non-isolated section and the isolated section, and the isolated section including one or more optical interface components arranged on the isolated section to interface with one or more components of the metrology hardware of the non-isolated section;
one or more terminals arranged to couple the utility meter to one or more utility conductors of a utility service; and
a second board disposed within the enclosure, the second board including one or more conductors coupled to the one or more terminals, the one or more conductors arranged to convey utility consumption information from the one or more terminals to the metrology hardware of the non-isolated section of the first board;
a first peripheral device arranged to interface with the apparatus via the first universal serial bus (USB) connection at the apparatus and using a first USB protocol, the first peripheral device comprising at least one of an environmental sensor, an external antenna, a signal amplifier, a relay, or a gateway;
a second USB connection at the apparatus having a second USB protocol, the second USB connection including a second USB port; and
an access panel located on an exterior of the enclosure and positioned such that the first USB port is accessible by opening the access panel, the second USB port being accessible by removing the enclosure.

5. The utility meter of claim 4, wherein the first and/or second USB connection is administered at least in part by a processor, based on an operating system stored in at least one computer-readable memory storage device.

6. The utility meter of claim 4, wherein the peripheral device is arranged to receive power from the apparatus via the first USB connection, and to at least one of: provide communications for the apparatus, provide sensor data to the apparatus, provide diagnostics of the apparatus, update firmware and/or software of the apparatus, and download data from the apparatus.

7. The utility meter of claim 4, wherein the peripheral device is arranged to be located external to the enclosure of the apparatus while coupled to the apparatus via the first USB connection, the enclosure including an access portion arranged to allow access to a USB port.

8. A method, comprising:
coupling a utility metering device to a utility service at a site, wherein the coupling includes coupling one or more terminals of the utility metering device to one or more utility conductors of the utility service;
enabling utility consumption information transfer from the one or more terminals of the utility metering device to one or more metrology components of a first board of the utility metering device via one or more conductors of a second board of the utility metering device that are coupled to the one or more terminals, the one or more metrology components being disposed within an enclosure and including at least one sensor arranged for measuring utility parameters;
coupling a first peripheral device to the utility metering device via a first universal serial bus (USB) connection at an isolated portion of the first board of the utility metering device, the isolated portion including a first USB port that is electrically isolated from a line voltage of a non-isolated portion of the first board of the utility metering device based on a predetermined conductor spacing between the non-isolated portion and the isolated portion;
coupling a second peripheral device to the utility metering device via a second USB connection of the utility metering device at a second USB port, where an access panel is located on an exterior of the enclosure and positioned such that the first USB port is accessible by opening the access panel, the second USB port being accessible by removing the enclosure; and
transferring data between the utility metering device and the first and/or second peripheral device via the first and/or second USB connection.

9. The method of claim 8, further comprising enabling data transfer between the utility metering device and the first and/or second peripheral device via the first and/or second USB connection using an operating system (OS) stored on at least one computer-readable memory storage device and operable on a processor coupled to the utility metering device.

10. The method of claim 8, further comprising establishing a network connection via a communications portion of the utility metering device and downloading a USB driver for the first and/or second peripheral device when the first and/or second peripheral device is coupled to the utility metering device.

11. The method of claim 8, further comprising supplying direct current (DC) power to the first and/or second peripheral device via the first and/or second USB connection.

12. The method of claim 8, further comprising receiving sensor data at the utility metering device from the first and/or second peripheral device via the first and/or second USB connection.

13. The method of claim 8, further comprising updating firmware and/or software of the utility metering device using the first and/or second peripheral device via the first and/or second USB connection.

14. The method of claim 8, further comprising running diagnostics and/or provisioning the utility metering device using the first and/or second peripheral device via the first and/or second USB connection.

15. The utility meter of claim 1, wherein the first PCB is a motherboard, the second PCB is a power supply board that further includes a power supply and is further arranged to supply electrical power to the second portion of the motherboard.

16. The utility meter of claim 15, wherein the power supply board is coupled to the processor via power conductors.

17. The utility meter of claim 4, wherein the first board is a motherboard, the second board is a power supply board that further includes a power supply and that is further arranged to supply electrical power to the isolated section of the motherboard, and the utility meter further comprises:

a processor board that is coupled to the motherboard and includes a processor and at least one computer-readable memory storage device, the processor arranged to facilitate data transfer via the first and/or second USB connection.

18. The utility meter of claim 1, wherein the at least one sensor of the metrology components of the first printed circuit board includes a Hall Effect sensor arranged in proximity to the one or more conductors of the second printed circuit board to measure utility parameters.

19. The method of claim 8, further comprising enabling electrically isolated information transfer between the isolated portion and the one or more metrology components of the non-isolated portion via a wireless radio transmission interface component disposed on the isolated portion, the wireless radio transmission interface component comprising at least one of a Zigbee, WiFi, or near field communication device.

* * * * *